US012291248B2

United States Patent
Brick et al.

(10) Patent No.: US 12,291,248 B2
(45) Date of Patent: *May 6, 2025

(54) AUTOMATED TIE MARKING

(71) Applicant: BNSF Railway Company, Fort Worth, TX (US)

(72) Inventors: Michael James Brick, Fort Worth, TX (US); Lisa Marie Kelly, Weatherford, TX (US); Samuel Minton, Brandon, SD (US); Richard William Keller, Spokane Valley, WA (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,015

(22) Filed: Nov. 14, 2022

(65) Prior Publication Data

US 2023/0278600 A1 Sep. 7, 2023

Related U.S. Application Data

(63) Continuation of application No. 17/687,025, filed on Mar. 4, 2022, now Pat. No. 11,565,730.

(51) Int. Cl.
*B61K 9/08* (2006.01)
*E01B 29/02* (2006.01)
(Continued)

(52) U.S. Cl.
CPC .............. *B61K 9/08* (2013.01); *E01B 29/02* (2013.01); *E01B 29/10* (2013.01); *E01B 29/26* (2013.01);
(Continued)

(58) Field of Classification Search
CPC ....... B61K 9/08; B61L 25/025; B61L 23/041; B61L 23/042; B61L 23/047; B61L 2205/04; E01B 35/00; E01B 29/32
(Continued)

(56) References Cited

U.S. PATENT DOCUMENTS 4,065,856 A * 1/1978 Waters .................... E01B 35/00
33/287
5,090,329 A * 2/1992 Theurer ............... G01C 15/004
33/287
(Continued)

FOREIGN PATENT DOCUMENTS

EP 2946982 A1 11/2015
WO 2021253062 A1 12/2021

OTHER PUBLICATIONS

Wilson, Bill, Do it Without stopping: FRA's Final Rule will allow track inspection market to take full advantage of technology, Nov. 30, 2020.
(Continued)

*Primary Examiner* — Zachary L Kuhfuss
(74) *Attorney, Agent, or Firm* — Whitaker Chalk Swindle & Schwartz PLLC; Enrique Sanchez, Jr.; Juan Vasquez

(57) ABSTRACT

A system and method for automating railroad maintenance for a tie gang using electronic tie marking (ETM) configured to optimize railroad asset maintenance. The system enables the automating of an adaptive maintenance process for the asset that is being maintainanced. The system can identify a railroad asset scheduled for maintenance using various forms of inspection including real-time kinematic (RTK)-corrected GPS data, radar signal processing data, and real-time imaging. The system also provides for the acquisition and upload of asset pictures for verification and analysis of a railroad asset. The system can identify a next location to perform maintenance and can calculate an optimum path based on sensor input incorporating machine-specific and environmental characteristics. The system further can provide a customizable user interface to identify, track, and process information related to maintenance of the railroad asset.

20 Claims, 8 Drawing Sheets

(51) Int. Cl.
*E01B 29/10* (2006.01)
*E01B 29/26* (2006.01)
*E01B 29/32* (2006.01)
*E01B 35/00* (2006.01)
*B61L 23/04* (2006.01)
*B61L 25/02* (2006.01)

(52) U.S. Cl.
CPC .............. *E01B 29/32* (2013.01); *E01B 35/00* (2013.01); *B61L 23/042* (2013.01); *B61L 23/047* (2013.01); *B61L 25/025* (2013.01)

(58) Field of Classification Search
USPC ............................................... 104/2; 382/104
See application file for complete search history.

(56) References Cited

U.S. PATENT DOCUMENTS

| | | | | |
|---|---|---|---|---|
| 5,487,341 | A * | 1/1996 | Newman | E01B 29/26 |
| | | | | 104/17.1 |
| 5,615,616 | A * | 4/1997 | Scheuchzer | E01B 29/28 |
| | | | | 104/2 |
| 5,740,547 | A * | 4/1998 | Kull | B61L 25/025 |
| | | | | 701/19 |
| 5,970,438 | A | 10/1999 | Clark et al. | |
| 7,451,632 | B1 * | 11/2008 | Otto | B61K 9/08 |
| | | | | 73/1.15 |
| 7,463,348 | B2 * | 12/2008 | Chung | G01C 3/08 |
| | | | | 356/237.1 |
| 7,616,329 | B2 * | 11/2009 | Villar | G01C 3/08 |
| | | | | 356/625 |
| 8,958,079 | B2 * | 2/2015 | Kainer | B61L 23/045 |
| | | | | 356/625 |
| 9,441,956 | B2 | 9/2016 | Kainer et al. | |
| 9,849,895 | B2 * | 12/2017 | Mesher | B61L 23/04 |
| 9,850,624 | B2 | 12/2017 | Schrunk, III | |
| 9,920,487 | B2 | 3/2018 | Delucia et al. | |
| 10,471,976 | B2 | 11/2019 | Mian | |
| 10,618,168 | B2 | 4/2020 | Gros et al. | |
| 10,625,760 | B2 * | 4/2020 | Mesher | B61L 23/045 |
| 10,730,538 | B2 * | 8/2020 | Mesher | B61K 9/08 |
| 10,807,623 | B2 * | 10/2020 | Mesher | B61L 23/044 |
| 11,124,207 | B2 * | 9/2021 | Naithani | B61L 23/048 |
| 11,377,130 | B2 * | 7/2022 | Mesher | B61L 27/04 |
| 11,565,730 | B1 * | 1/2023 | Brick | E01B 35/00 |
| 11,628,869 | B1 * | 4/2023 | Brick | B61L 23/041 |
| | | | | 701/20 |
| 12,077,197 | B2 * | 9/2024 | Brick | B61K 9/08 |
| 2002/0078853 | A1 | 6/2002 | Holmes et al. | |
| 2003/0048193 | A1 | 3/2003 | Puckette et al. | |
| 2006/0012246 | A1 | 1/2006 | Smith et al. | |
| 2007/0217670 | A1 | 9/2007 | Bar-Am | |
| 2012/0192756 | A1 | 8/2012 | Miller et al. | |
| 2012/0296562 | A1 | 11/2012 | Carlson et al. | |
| 2013/0191070 | A1 | 7/2013 | Kainer et al. | |
| 2015/0268172 | A1 | 9/2015 | Naithani et al. | |
| 2015/0367872 | A1 * | 12/2015 | Plotnikov | B61L 3/18 |
| | | | | 246/121 |
| 2016/0046308 | A1 | 2/2016 | Chung et al. | |
| 2017/0227470 | A1 | 8/2017 | Cesarano | |
| 2017/0320507 | A1 | 11/2017 | Denny et al. | |
| 2018/0281829 | A1 | 10/2018 | Euston et al. | |
| 2019/0176862 | A1 | 6/2019 | Kumar et al. | |
| 2019/0194878 | A1 | 6/2019 | Hamilton et al. | |
| 2019/0248396 | A1 | 8/2019 | Khosla | |
| 2020/0160733 | A1 | 5/2020 | Dick et al. | |
| 2020/0270819 | A1 | 8/2020 | Irion et al. | |
| 2021/0171072 | A1 | 6/2021 | Hamilton et al. | |
| 2021/0245747 | A1 | 8/2021 | Naithani et al. | |
| 2023/0228042 | A1 | 7/2023 | Lichtberger | |

OTHER PUBLICATIONS

Trinh et al., Enhanced Rail Component Detection and Consolidation for Rail Track Inspection, Jan. 31, 2012.
International Patent Application No. PCT/US2023/013943 International Search Report and Written Opinion, mailed Jul. 31, 2023, 22 pages.

* cited by examiner

AUTOMATED TIE MARKING

CROSS-REFERENCE TO RELATED APPLICATIONS

The present application is a Continuation Application of U.S. patent application Ser. No. 17/687,025, filed Mar. 4, 2022, the contents of which are incorporated herein in its entirety for all purposes.

TECHNICAL FIELD

The present disclosure relates generally to the management of railroad asset maintenance, and more particularly to systems and methods for automated railroad asset maintenance for railroad system infrastructure.

BACKGROUND

Railroad assets such as railroad ties, spikes, ballast, and other assets degrade over time. If the railroad assets are subjected to extreme elements, the assets can degrade at a much higher rate. Accordingly, significant resources have been dedicated to inspecting and repairing such railroad infrastructure. Traditional approaches to identifying and repairing/replacing degraded railroad assets suffer from many shortcomings. For example, identifying a railroad spike to replace can be difficult. Generally, the railroad spike can have asset location data, such as the latitude and longitude of the railroad asset. However, the method to arrive at the latitude and longitude provides difficulty in locations without sufficient global positioning system (GPS) signal strength.

Conventional approaches can use a number of methods, including counting railroad ties to identify their location. Such an approach can provide wide variability and inaccuracies. For example, these approaches can be as far off of the target railroad asset by tens of railroad ties. Naturally, being so far off of the target can cause significant efficiency errors in maintaining a railroad. Additionally, railroad personnel are still required to use the improper GPS data and travel to the improper location to perform maintenance on the railroad asset. Inefficient maintenance procedures can lead to near impossible railroad asset maintenance when based on inaccurate location information. And the determination of whether an asset is to receive maintenance can be subjective without any uniformity based on a visual determination of asset integrity.

Finding the correct railroad asset is another problem. In the rare case that the maintenance crew reaches the correct location, identifying the correct railroad asset prior to repair/replacement requires manual intervention for the maintenance crew to visually inspect the asset to determine if it indeed requires maintenance. Visually inspecting an asset can be confusing to the maintenance crew because the asset might be damaged, dirty, and obfuscated. Moreover, the maintenance crew requires various machines to complete maintenance, each machine working on the railroad asset one at a time. In this manner, a first group of the maintenance crew can reach the railroad asset minutes, or even hours, before a second group of the maintenance crew. By approaching the railroad asset at different times, the difficulty to identify the same railroad asset increases because there might be no efficient way to communicate which railroad asset was worked on by the first group. Although there is an antiquated approach to railroad asset maintenance, it is near impossible to consistently maintain an entire railroad in a comparable manner.

The costs associated with the aforementioned traditional operations can be staggering. For example, given tens of thousands of miles of railroad track, the cost of paint alone can be in the hundreds of thousands. With only two tie painters per tie gang, the employee cost for providing the tie painters can be in the millions per year.

SUMMARY

The present disclosure achieves technical advantages as a system and method for automating railroad maintenance by a tie gang using Electronic Tie Marking (ETM) configured to optimize railroad asset maintenance. The present system enables the automating of an adaptive maintenance process for the asset that is being maintainanced (e.g., Rails, Ties, Ballasts, Turnouts, Crossings, etc.). The system can identify a railroad asset scheduled for maintenance using various forms of inspection including real-time kinematic (RTK)-corrected GPS data, radar signal processing data, and real-time imaging, among others. The system can utilize RTK-corrected GPS coordinates from ground stations in communication with a tie gang. The system also provides for the acquisition and upload of asset pictures for verification and analysis of a railroad asset. The system can identify a next location to perform maintenance and can calculate an optimum path based on sensor input incorporating machine-specific and environmental characteristics. The system can provide a customizable user interface to identify, track, and process information related to maintenance of the railroad asset.

The present disclosure solves the technological problem of navigating a tie gang to railroad assets needing maintenance and providing the tie gang with a system configured to capture an image of a railroad asset to verify the railroad asset and analyze a health of the railroad asset. The system can be disposed in a lead machine of the tie gang (or have a distributed architecture) and enable the tie gang to efficiently perform maintenance on the railroad asset. The present disclosure goes beyond mere manual inspection and maintenance of a railroad asset, incorporating at least image analysis functionality and machine learning modules that can identify whether the railroad asset is to be maintainenced, GPS receivers (including RTK-corrected GPS) to provide greater location granularity, location calibration, receipt of predetermined maintenance information, and location information for a maintenance operation. Advantageously, the system can perform an analysis of the railroad asset based on physical characteristics of the railroad asset determined from the image, and by providing calibration techniques for the tie gang to locate the railroad asset within centimeters. This also provides the benefit of simplifying the maintenance process for the tie gang by providing them with only relevant information needed for a particular railroad asset, so the tie gang can conduct their maintenance more quickly, more clearly, and more concisely, without inefficient duplicative work.

The present disclosure provides a technical solution to the technical problem by acquiring maintenance data for one or more railroad assets, providing location calibration for the tie gang, analyzing an image of the railroad asset, and automating the maintenance procedures of the railroad asset. In contrast, traditional systems simply rely on manual processes and often-inaccurate location information, resulting in inefficient maintenance procedures inundated with errors, redundant work, and add to the strain on an already overspent system. The present disclosure can not only determine exactly where the railroad asset that needs to be replaced or maintenance is located, but can also enable an automated maintenance process as disclosed in more detail below.

In one embodiment, the system can include an ability to determine a movement path of the tie gang, avoid collisions between machines in the tie gang, generate machine production identifiers to queue a workflow of railroad asset maintenance, and display a user interface in the machines. By way of overview, the process flow can begin at the machine production identifier, which can be displayed on a user interface (UI) operable by a crew member in the tie gang performing maintenance on a section of track or another railroad asset. Using track maintenance as an example, the tie gang can generate trackside inspections with or without connectivity using a local file distribution system. The precise location (e.g., latitude and longitude coordinates) of a user/client can be determined using RTK-corrected GPS data from a GPS disposed within the tie gang, comparing the location information for the railroad asset with visual techniques to determine a precise location, or comparing the location information of the railroad asset with a combination of RTK-corrected GPS data, visual techniques, and radar signal processing. The system can transmit the production identifiers to the machines of the tie gang for ease of railroad asset identification. In current applications, the maintenance of railroad assets is based on a time to complete the maintenance, rather than organized using a workflow production system and production identifiers. For example, some tie gangs can complete railroad maintenance in half the time as another tie gang, which leads to inconsistencies in maintenance management. The use of production identifiers can free up the systemic inefficiency of railroad maintenance.

The system also can display information about the production identifier using the UI. The UI can include direction, location, railroad asset information, among other characteristics important to the tie gang. The UI can include a map having the railroad line segment milepost to the client to generate a workflow schedule. The location data can be captured at the trackside, along with the asset data for the track type (e.g., mainline, main one, main two, main three, turnout, switch, bridge, crossover, etc.), as well as any defect data. In one exemplary embodiment, users can store maintenance instructions for one or more sections of track on a client locally without connectivity, and once connectivity is acquired, all the stored inspections can be uploaded to a central server and further processed by the backend system.

The system also can determine a movement path of the tie gang. The movement path can be based on various factors impacting an ability of the tie gang to travel along the tracks of the railroad. For example, the various factors can include both vehicle characteristics and external environmental characteristics. Particularly, the movement of the tie gang can be heavily reliant on the weight of the machines, the length of the machines, and environmental conditions. For example, the weight of the machines in the tie gang might increase if collecting discarded railroad assets or decrease if depositing new railroad assets. Additionally, the system can optimize a movement path of the tie gang based on a braking algorithm to determine the appropriate braking maneuvers to apply to reach a next railroad asset to perform maintenance.

The system also can perform collision avoidance for the machines in the tie gang. The tie gang can include a plurality of machines and the track can include curves that block the line of sight for the engineers in the tie gang. Accordingly, the poor visual ability of the machines of the tie gang can result in hazardous conditions. The system can determine when an obstacle is ahead of the machines of the tie gang and can apply brakes of the machines in the tie gang accordingly. For example, when the obstacle is another machine, the machines of the tie gang can include forward-looking radar systems to identify whether the obstacle machine is ahead of the respective machine in the tie gang. Alternatively, the machines of the tie gang can perform machine-to-machine (M2M) communications to establish distances between the machines for enhanced safety.

It is an object of the invention to provide a system for generating a strategic track and maintenance planning inspection record for a railroad asset. It is a further object of the invention to provide a method for generating a strategic track and maintenance planning inspection record for a railroad asset. These and other objects are provided by at least the following embodiments.

In one embodiment, a method for performing maintenance using electronic tie marking (ETM), comprising: receiving a maintenance operation request for a maintenance item, the request having a calibration location, predetermined maintenance information, and location information for a maintenance operation; positioning a first vehicle having a GPS receiver identifying the first vehicle location at the calibration location by correlating the first vehicle location with the calibration location; calculating a travel distance from the calibration location to a maintenance location based on the maintenance information; traveling the travel distance from the calibration location to the maintenance location to perform the maintenance operation for a maintenance item at the maintenance location; capturing an image of the maintenance item; generating an analysis of the maintenance item based on the image; and automatically performing a maintenance operation based on the analysis. Wherein the method further comprises: verifying a calibration location of a machine based on the maintenance information and the location information; and traveling to the calibration location to calibrate the machine. Wherein the file is via a Universal Serial Bus (USB). Wherein the calibration location is verified based on a comparison between the location information with real-time kinematic (RTK) corrected global position system (GPS) data, radar signal processing, and a real-time image. The method further comprising transmitting the image to a central server to generate the analysis, wherein the central server includes a server on a machine in a tie gang or the central server includes a server in a cloud-based environment. Wherein the maintenance item is to receive maintenance when the analysis meets a condition. Wherein the maintenance item is to receive maintenance based on a maintenance indicator, wherein the maintenance indicator is based on whether the maintenance item already received maintenance. Wherein the maintenance item is to receive maintenance based on a comparison between the maintenance information and information from the image including railway plate hole characteristics, railway spike patterns, and a distance corresponding to the plate hole characteristics. Wherein the maintenance information includes tie marking information and tie grading information. Wherein the maintenance action is based on at least one workhead actions such as spike pulling, anchor spreading, and tie kicking, wherein the maintenance item includes a railway tie. Wherein the analysis is based on image analysis techniques, wherein the image analysis techniques include a machine learning model.

In another embodiment, a method for guiding a tie gang to perform maintenance, comprising: receiving a location signal; comparing the location signal with location information from a file to calibrate a location of a machine; calculating a distance of a path from the location of the machine to a maintenance location; traveling to the maintenance location. Wherein the method further comprises identifying an edge of a track along the path based on sensor information. Wherein the sensor information includes at least one of a real-time image or radar signal processing data. Wherein the location signal includes at least one of radar signal processing data, global positioning system (GPS) data, or real-time kinematic (RTK)-corrected GPS data.

In another embodiment, a system for electronic tie marking (ETM), comprising: a memory including railway markings for ETM; and a networked computer processor operably coupled to the memory and capable of executing machine-readable instructions to perform program steps, the program steps comprising: receiving a maintenance operation request for a maintenance item, the request having a calibration location, predetermined maintenance information, and location information for a maintenance operation; positioning a first vehicle having a GPS receiver identifying the first vehicle location at the calibration location by correlating the first vehicle location with the calibration location; calculating a travel distance from the calibration location to a maintenance location based on the maintenance information; traveling the travel distance from the calibration location to the maintenance location to perform the maintenance operation for a maintenance item at the maintenance location; capturing an image of the maintenance item; generating an analysis of the maintenance item based on the image; and automatically performing a maintenance operation based on the analysis. Wherein the file is via a Universal Serial Bus (USB). Wherein the calibration location is verified based on a comparison between the location information with real-time kinematic (RTK) corrected global position system (GPS) data, radar signal processing, and a real-time image. Wherein the program steps further comprising transmitting the image to a central server to generate the analysis, wherein the central server includes a server on a machine part of a tie gang or a server in a cloud-based environment. Wherein the maintenance item is to receive maintenance when a paint marker is present. Wherein the maintenance item is to receive maintenance based on a maintenance indicator, wherein the maintenance indicator is based on whether the maintenance item already received maintenance. Wherein the maintenance item is to receive maintenance based on a comparison between the maintenance information and information from the image including railway plate hole characteristics, railway spike patterns, and a distance corresponding to the plate hole characteristics. Wherein the location information includes latitude and longitude information. Wherein the maintenance information includes tie marking information and tie grading information. Wherein the maintenance action is based on at least one of spike pulling, an anchor spreading, or tie kicking, wherein the maintenance item includes a railway tie. Wherein the analysis is based on image analysis techniques, wherein the image analysis techniques include a machine learning model.

In another embodiment, a system for guiding a tie gang to perform maintenance, comprising: a memory including railway markings for electronic tie marking (ETM); and a networked computer processor operably coupled to the memory and capable of executing machine-readable instructions to perform program steps, the program steps comprising: receiving a location signal; comparing the location signal with location information from a file to calibrate a location of a machine; identifying a maintenance location based on sensor information; calculating a distance from the location of the machine to the maintenance location; identifying an edge of a track based on sensor information; and traveling to the maintenance location. Wherein the location signal includes a global positioning system (GPS) signal, a real-time kinematic corrected global positioning system (GPS) data, or radar signal processing data. Wherein the sensor information includes a real-time image or radar signal processing data. Wherein the sensor information includes a real-time image and radar signal processing data.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
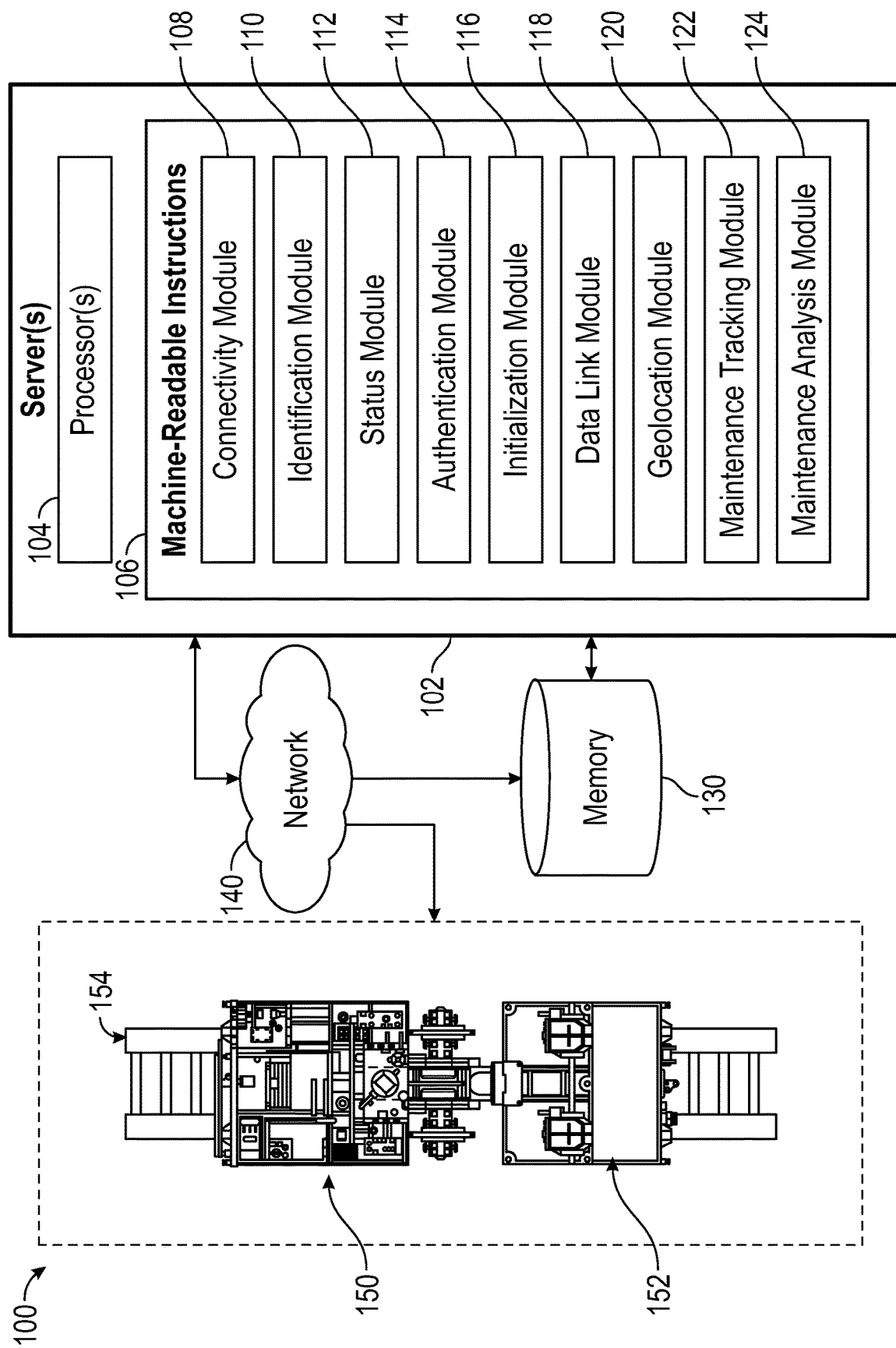
FIG. 1 illustrates a railroad asset maintenance system schematic, in accordance with one or more exemplary embodiments of the present disclosure.

FIG. 1 illustrates a schematic view of a railroad asset maintenance system 100, in accordance with one or more exemplary embodiments of the present disclosure. The system 100 can include one or more servers 102 having one or more processor(s) 104, a memory 130, machine-readable instructions 106, including a connectivity module 108, identification module 110, status module 112, authentication module 114, initialization module 116, data link module 118, and geolocation module 120, among other relevant modules. The server 102 can be operably coupled to one or more clients via a network 140. The client can be a machine 150 including a railroad maintenance assembly 152 as part of a tie gang along a railway 154. In another exemplary embodiment, the machine 150 can include an application configured to communicate with the server 102 over the network 140.

The aforementioned system components (e.g., server(s) 102 and machine 150) can be communicably coupled to each other via the network 140, such that data can be transmitted. The network 140 can be the Internet, intranet, or other suitable network. The data transmission can be encrypted, unencrypted, over a VPN tunnel, or other suitable communication means. The network 140 can be a WAN, LAN, PAN, or other suitable network type. The network communication between the clients, server 102, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases can be operably coupled to the system components via the network 140.

The data transmitted to and from the components of system 100 (e.g., the server 102 and machine 150), can include any format, including JavaScript Object Notation (JSON), TCP/IP, XML, HTML, ASCII, SMS, CSV, representational state transfer (REST), or other suitable format. The data transmission can include a message, flag, header, header properties, metadata, and/or a body, or be encapsulated and packetized by any suitable format having same.

The server(s) 102 can be implemented in hardware, software, or a suitable combination of hardware and software therefor, and may comprise one or more software systems operating on one or more servers, having one or more processor(s) 104, with access to memory 130. Server(s) 102 can include electronic storage, one or more processors, and/or other components. Server(s) 102 can include communication lines, connections, and/or ports to enable the exchange of information via a network (e.g., the network 140) and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 130.

Memory 130 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 140.

Processor(s) 104 can be configured to provide data processing capabilities in server(s) 102. As such, processor(s) 104 can include one or more of a digital processor, an analog processor, a digital circuit designed to process information, an analog circuit designed to process information, a state machine, and/or other mechanisms for electronically processing information, such as FPGAs or ASICs. The processor(s) 104 can be a single entity or include a plurality of processing units. These processing units can be physically located within the same device, or processor(s) 104 can represent processing functionality of a plurality of devices or software functionality operating alone, or in concert.

The processor(s) 104 can be configured to execute machine-readable instructions 106 or machine learning modules via software, hardware, firmware, some combination of software, hardware, and/or firmware, and/or other mechanisms for configuring processing capabilities on processor(s) 104. As used herein, the term "machine-readable instructions" can refer to any component or set of components that perform the functionality attributed to the machine-readable instructions component 106. This can include one or more physical processor(s) 104 during execution of processor-readable instructions, the processor-readable instructions, circuitry, hardware, storage media, or any other components.

The server(s) 102 can be configured with machine-readable instructions having one or more functional modules. The machine-readable instructions 106 can be implemented on one or more servers 102, having one or more processor(s) 104, with access to memory 130. The machine-readable instructions 106 can be a single networked node, or a machine cluster, which can include a distributed architecture of a plurality of networked nodes. The machine-readable instructions 106 can include control logic for implementing various functionality, as described in more detail below. The machine-readable instructions 106 can include certain functionality associated with the system 100. Additionally, the machine-readable instructions 106 can include a smart contract or multi-signature contract that can process, read, and write data to the database, distributed ledger, or blockchain.

The maintenance assembly 152 can include various maintenance assemblies to perform maintenance. For example, the maintenance assembly 152 can include assemblies such as a computer, GPS, control and display units, workhead assemblies, among other relevant assemblies for performing maintenance.

Figure 2:
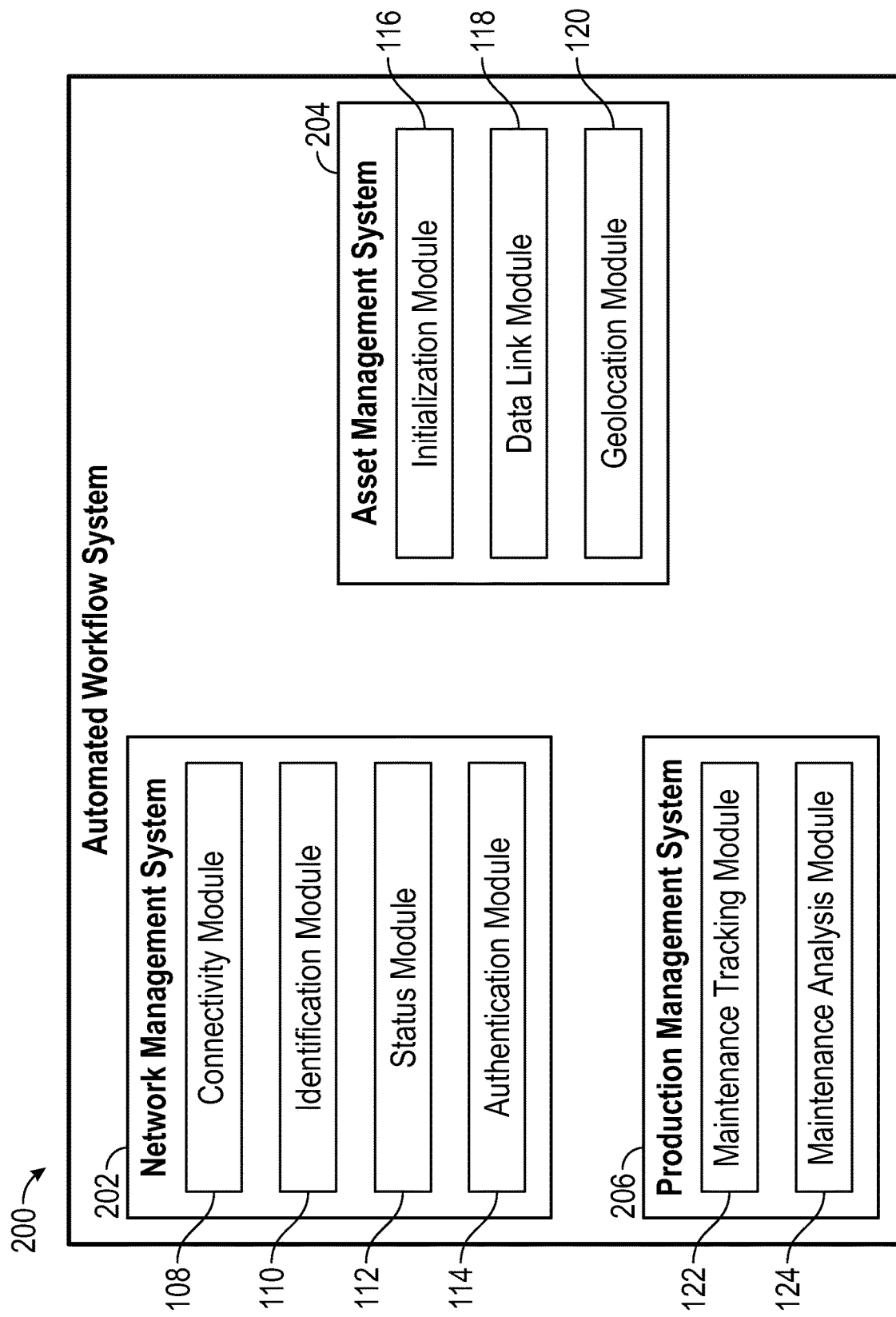
FIG. 2 illustrates a block diagram of an automated workflow system, in accordance with one or more exemplary embodiments of the present disclosure.

FIG. 2 illustrates a schematic view of an automated workflow system 200, in accordance with one or more exemplary embodiments of the present disclosure. The system 200 can include a network management system 202, an asset management system 204, and a production management system 206. Although certain exemplary embodiments may be directed to rail assets, the system 200 can be used to plan maintenance for a type of railroad asset, including rails, ballasts, panels, ties, turnouts, facilities, or any suitable asset.

In one exemplary embodiment, the network management system 202 can include a connectivity module 108, identification module 110, status module 112, and authentication module 114. The connectivity module 108, identification module 110, status module 112, and authentication module 114 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The network management system 202 can be configured to send and receive messages related to an inspection or other suitable activity, to and from the client or server. In another exemplary embodiment, the network management system 202 can generate one or more elements for display on the user device. The elements can provide additional information to the user related to an inspection. For example, alerts can be generated by the network management system 202 and displayed on the client to indicate inspection count, inspection completion, inspection submission, inspection request, or other suitable information. Additionally, system symbols can be displayed on the client to indicate inspection status.

The connectivity module 108 can establish a network connection between the vehicle and the one or more servers 102. For example, the connectivity module 108 can execute either hardware or software to wirelessly, or in a wired manner, connect to the network 140. The connectivity module 108 compares a strength of a network connectivity of the server 102 with a known value to determine the network is accessible. In an example, the connectivity module 108 can ping a known address of the vehicle to determine whether the vehicle is accessible. For example, the connectivity module 108 can store the Internet Protocol (IP) addresses of a plurality of vehicles to perform maintenance and transmit electrical signals through the network 140 to the IP addresses. If the vehicle is accessible based on a response from one or more of the vehicles (e.g., based on responses from the particular IP addresses), the connectivity module 108 can execute the identification module to further determine whether the vehicle is an identified vehicle for performing maintenance on the railway.

The identification module 110 can identify whether the responses from the vehicles correspond with an identified vehicle for performing maintenance on the railway. For example, the identification module 110 can correlate information from the connectivity module 108 with a workflow queue including a schedule of all the maintenance to be performed on the particular railway. The identification module 110 can compare the information from the responses with the workflow queue to verify the vehicle is the identified vehicle to perform the maintenance.

The status module 112 can list data stored on the server 102 for a particular user. In another example, the status module 112 can indicate the status of one or entries stored on the client or server for a particular user. For example, an inspection stored on the server 102 can be displayed on a client and labeled with its status (e.g., "in progress," "completed," or "to be completed") on a dashboard page of the client. In another example, the status module 112 can display a notification on the client of a status change or a new requirement (e.g., new or re-inspection, capital plan generation, approval request, change request, etc.).

The authentication module 114 authenticate a user on a client, such as a mobile phone, laptop, tablet, wearable device, or other suitable device. For example, the authentication module 114 can authenticate a user or the vehicle using a username, password, authentication token, biometric, or other suitable attribute received from the vehicle or user. In an example embodiment, the authentication module 114 can generate an authentication token for a particular user, session, or request. In another example, the authentication module 114 can generate an authentication token using user data stored in the client. For example, a user can access a client by providing valid credentials via a login page or screen, including a username and password, biometrics, multi-factor authentication, or other suitable credential, such credentials, along with a user's information such as name, username, employee number, etc, can be stored in the client or server. In another example, the authentication module 114 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology. In an example, the authentication token can allow for single sign-on authentication to the server and/or memory from the client.

In one exemplary embodiment, the asset management system 204 can include an initialization module 116, data link module 118, and a geolocation module 120. The initialization module 116, data link module 118, and a geolocation module 120 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The asset management system 204 can be configured to send and receive messages related to an inspection or other suitable activity, to and from the client or server. In another exemplary embodiment, the asset management system 204 can generate one or more elements for display on the user device. The elements can provide additional information to the user related to an inspection. For example, alerts can be generated by the asset management system 204 and displayed on the client to indicate inspection count, inspection completion, inspection submission, inspection request, or other suitable information. Additionally, system symbols can be displayed on the client to indicate inspection status.

In an embodiment, the initialization module 116 can initiate an action. For example, the actions can include asset type selection, create inspection, download plans, search inspections, change settings, or other suitable action. In an example, the initialization module 116 can upload inspections to or download inspections from the server. In an example, the initialization module 116 can initiate an action by calling or instantiating one or more modules on the server, WebUI, or client. In another example, one or more inspections may be transferred to or received from the client via the initialization module 116 over an encrypted network (e.g., the network 140).

In one exemplary embodiment, data link module 118 can establish a data link to the vehicle. For example, the data link module 118 can establish the data link using a virtual environment over the network. In another example, the data link module 118 can establish the data link using satellite communications when the vehicle is in remote locations. In an example, the data link module 118 can include a custom protocol arrangement for optimum communication between the vehicle and the server. In an example, the data link module 118 can establish data links with a plurality of vehicles to transmit data to all available vehicles performing maintenance.

The data link module 118 can identify whether the data link is established based on a value of a signal threshold. For example, the signal threshold can correspond to wireless communication signal strength and be reliant on the vehicle location. When the vehicle is in a remote area of geography, without any cellular reception, or any satellite availability, the signal threshold can be at a minimum. Alternatively, when the vehicle is within an area able to reach cellular signal or satellite availability, the signal threshold can be at a maximum.

In one exemplary embodiment, the geolocation module 120 can transmit and receive location coordinates of the vehicle. For example, the geolocation module 120 can locate the vehicle based on radio frequency triangulation, trilateration, electromagnetic sensor detection, or from latitude and longitude values, or another suitable geolocation method. In another example, the geolocation module 120 can locate a plurality of vehicles performing maintenance on a railway. For example, the geolocation module 120 can locate the vehicle based on real-time imaging. In an example, the vehicle can transmit the real-time images and the geolocation module 120 can process the images to compare the images to a known location to identify the location of the vehicle.

For example, during railway maintenance, a user can begin inspecting a rail segment by beginning at a start point on a first end of the rail segment and capture a series of data points related to the segment. In order to begin logging the data related to an inspection, the user's location must first be determined. In one exemplary embodiment, the user's location can be identified by receiving one or more characteristics of the user's location (e.g., line segment, milepost location, etc.) or by utilizing the GPS functionality of the client. In another exemplary embodiment, once the GPS location (latitude and longitude coordinates) are determined, the geolocation module 120 can determine one or more characteristics of the user's location (e.g., line segment, milepost location, curve—high rail or low rail, etc.). In another exemplary embodiment, the GPS coordinates can determine the line segment and the mileposts by correlating the GPS coordinates with those stored in a geographic information system (GIS) database. For example, a GIS database can include one or more rail segment characteristics associated with a particular latitude and longitude coordinate.

In one exemplary embodiment, the production management system 206 can include a maintenance tracking module 122 and maintenance analysis module 124. The maintenance tracking module 122 and maintenance analysis module 124 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The network management system 202 can be configured to send and receive messages related to an inspection or other suitable activity, to and from the client or server. In another exemplary embodiment, the network management system 202 can generate one or more elements for display on the user device. The elements can provide additional information to the user related to an inspection. For example, alerts can be generated by the network management system 202 and displayed on the client to indicate inspection count, inspection completion, inspection submission, inspection request, or other suitable information. Additionally, system symbols can be displayed on the client to indicate inspection status.

The maintenance tracking module 122 can monitor the workflow queue for the maintenance of the railway. For example, the maintenance tracking module 122 can push or pop elements of the workflow queue to either add maintenance requirements or remove maintenance requirements. For example, as the tie gang moves across the railway, the maintenance tracking module 122 can remove the maintenance requirements the tie gang performed. In another example, the maintenance tracking module 122 can assign identifiers to each element of the workflow queue. For example, each of the elements of the workflow queue can include unique tasks directing the tie gang to perform particular tasks to resolve the maintenance for the railway. The maintenance tracking module 122 can generate unique identifiers for each of the tasks to optimize the maintenance process for the tie gang.

The maintenance analysis module 124 can inspect the tie gang efficiency for performing maintenance on the railway. For example, the maintenance analysis module 124 can compare the efficiency to a known value to determine whether the tie gang is performing within a suitable time frame. In another example, the maintenance analysis module 124 can compare the efficiency with an organizational average to determine whether the tie gang is efficient.

Figure 3:
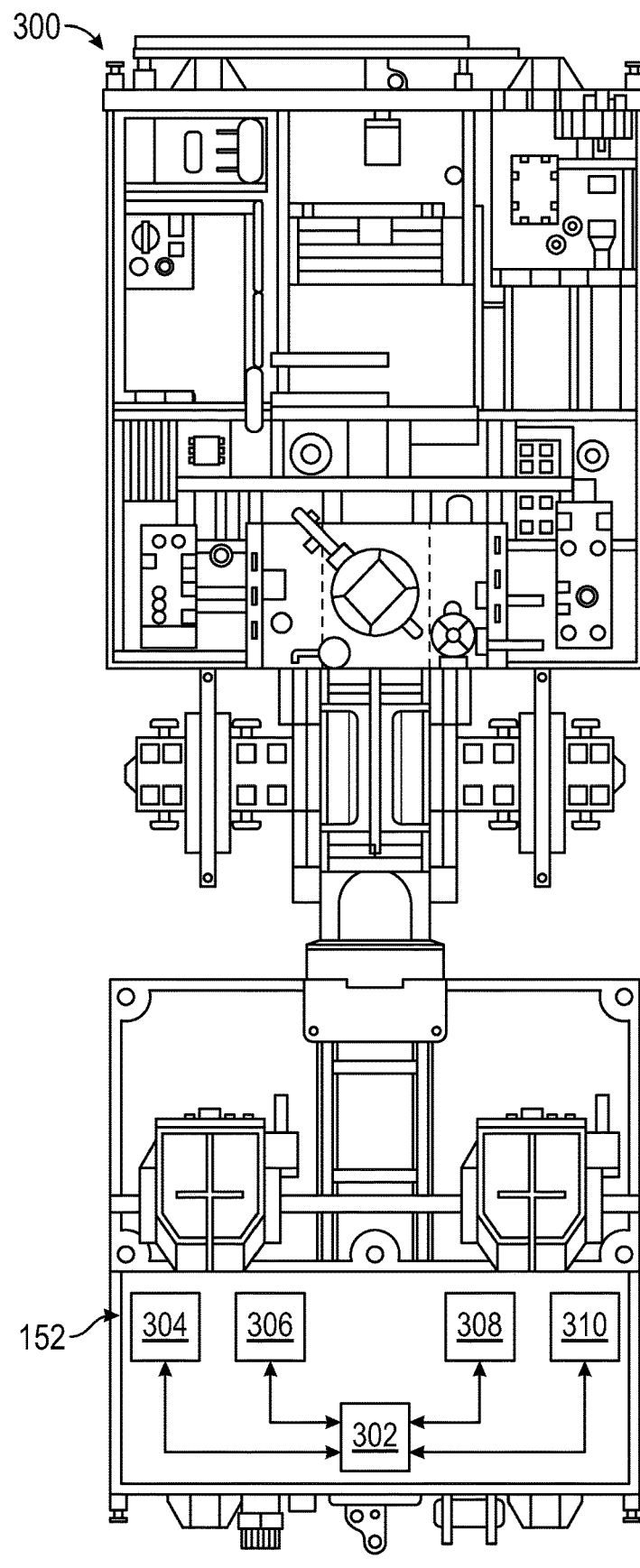
FIG. 3 illustrates a block diagram of a machine in a tie gang, in accordance with one or more exemplary embodiments of the present disclosure.

FIG. 3 illustrates block diagram of a machine in a tie gang 300, in accordance with one or more exemplary embodiments of the present disclosure. In an embodiment, the machine 300 can be the same as the machine 150 in FIG. 1. The machine 300 can include the maintenance assembly 152, which includes a computer 302, positioning assembly 304, a main control and display assembly 306, a workhead assembly 308, and image capture and analysis assembly 310. The aforementioned components are operably coupled to transfer information.

The computer 302 can process instructions and processes to the individual components of the machine 300. For example, the computer 302 can instruct the positioning assembly 304, a main control and display assembly 306, a workhead assembly 308, and image capture and analysis assembly 310 to execute the respective programs. In another example, the programs being executed can include software executable instructions, firmware that controls hardware, or any combination thereof. In another example, the computer 302 can receive a maintenance operation request for a maintenance item. For example, the computer 302 can receive files including the maintenance operation via Universal Serial Bus (USB). The computer 302 can locate files associated with a maintenance operation request based on an identifier for the files.

In another example, the computer 302 can receive data for the maintenance operation and organize the data in response to known fields. For example, the computer 302 can organize the data based on maintenance item type, maintenance operation request type, a type of vehicle, or another type of identifier to organize the data. In another example, the computer 302 can append data to existing data sets to add a new maintenance operation while the machine 300 is in the field. In another example, the computer 302 can remove data from the existing data to remove an old maintenance operation.

The positioning assembly 304 can execute instructions to receive location signals and identify a location of the machine 300. For example, the positioning assembly 304 can receive electromagnetic signal from a GPS satellite including latitude and longitude data for the positioning assembly 304 to identify the location of the machine 300. In another example, the positioning assembly 304 can verify a calibration location. For example, the positioning assembly 304 can verify the calibration location based on a comparison between values of the location information with GPS data. The values of the location information can include latitude and longitude values associated with a location of the vehicle. In another example, the positioning assembly 304 can verify the calibration location using RTK-corrected GPS data, radar signal processing, and/or a real-time image. In an example, the positioning assembly 304 can compare the values of the location information with the GPS data including calculating a difference between the values with the GPS data. The difference can indicate whether the vehicle is located at the calibration location and whether the vehicle is calibrated.

In another example, the positioning assembly 304 can identify the location of the machine 300 using localized means for location detection. For example, the machine 300 can identify the location of the machine 300 based on radar positioning. In an example, the machine 300 can transmit radio frequency energy and receive a response signal. From the response signal, the first locomotive can identify a location. Alternatively, the positioning assembly 304 can identify the location using real-time imaging. For example, the machine 300 can identify the location based on matching a physical location from the real-time images.

In another example, the positioning assembly 304 can transmit and receive electromagnetic energy. For example, the first locomotive can include a radar to transmit and receive the electromagnetic energy. The radar can receive a response from the electromagnetic energy reflecting off the local environment. From the response, the machine 300 can generate an image of the surrounding environment of the machine 300. In another example, the positioning assembly 304 can calculate a travel distance from the calibration location to a maintenance location based on the maintenance information. In another example, the positioning assembly 304 can verify a calibration location of a machine based on the maintenance information and the location information.

The main control and display assembly 306 can execute instructions to move the machine 300. For example, the main control and display assembly 306 can execute instructions to transfer power to an electromechanical locomotive assembly resulting in the machine 300 to move. The main control and display assembly 306 can operate workheads of the machine 300. For example, the main control and display assembly 306 can execute any of the modules in the main control system 420 and/or the workhead system 436. In an example, the main control and display assembly 306 can activate the spike puller module 438 to perform maintenance on the railway. For example, the main control and display assembly 306 can control the workhead modules manually or automatically. For example, the main control and display assembly 306 can be used by an operator to control one of the workhead modules to perform the maintenance on the railway. Alternatively, the main control and display assembly 306 can automatically control the workhead modules to operate.

In another example, the main control and display assembly 306 can display information regarding the operations for maintenance. For example, the display can include a mobile phone, laptop, tablet, virtual reality system, augmented reality system, heads up display, or another type of display. In an example, the main control and display assembly 306 can show icons that correspond to the various operations and maintenance the machine 300 can perform. For example, the main control and display assembly 306 can illuminate the display as part of a windshield of the machine 300 in an augmented reality manner.

In another example, the main control and display assembly 306 can position a machine 300 having a GPS receiver identifying the machine 300 location at the calibration location by correlating the machine 300 location with the calibration location. In another example, the main control and display assembly 306 can travel the travel distance from the calibration location to the maintenance location to perform the maintenance operation for a maintenance item at the maintenance location. In another example, the main control and display assembly 306 can travel to the calibration location to calibrate the machine.

In another example, the main control and display assembly 306 can control movement of the machine 300. For example, the main control and display assembly 306 can cause the machine 300 to accelerate, decelerate, or stop completely. In another example, the main control and display assembly 306 can be controlled manually or automatically. For example, an operator can control the main control and display assembly 306 to move the machine 300. Alternatively, the main control and display assembly 306 can be controlled automatically based on various sensor inputs.

The workhead assembly 308 can execute instructions to perform any of the workhead modules in the workhead system 436. Just as one example, the workhead assembly 308 can execute a spike puller associated to the spike puller module 438.

The image capture and analysis assembly 310 can execute instructions to execute an image capture module. For example, the image capture and analysis assembly 310 can capture an image of the maintenance item. In an example, the image capture and analysis assembly 310 can control a camera of the machine 300. The image can include an environment of the machine 300. Alternatively, the image can include the maintenance item.

In another example, the image capture and analysis assembly 310 can generate an analysis of the maintenance item based on the image. For example, the analysis is based on image analysis techniques. In an example, wherein the image analysis techniques can include a machine learning model. In another example, the image capture and analysis assembly 310 can transmit the image to a central server to generate the analysis. For example, the central server includes a server on a machine in a tie gang. In another example, the central server includes a server in a cloud-based environment.

In another example, the image capture and analysis assembly 310 can identify the location of the machine 300 based on the image of the environment. The image capture and analysis assembly 310 can correlate the image of the environment with the location information to match the image of the environment to the location of the machine 300

Figure 4:
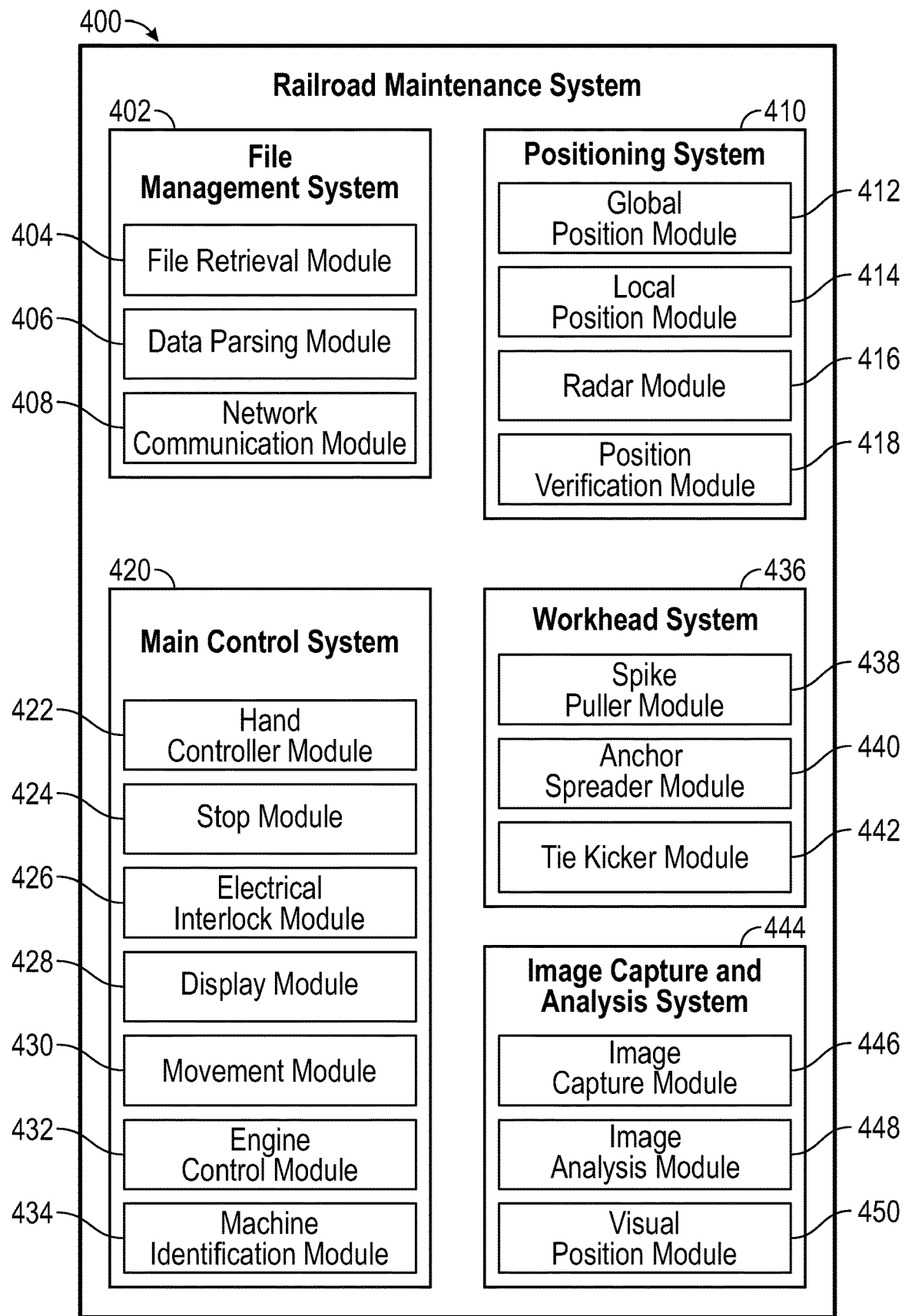
FIG. 4 illustrates a block diagram of a railroad maintenance system, in accordance with one or more exemplary embodiments of the present disclosure.

FIG. 4 illustrates a schematic view of a railroad maintenance system 400, in accordance with one or more exemplary embodiments of the present disclosure. The system 400 can include a file management system 402, positioning system 410, main control system 420, workhead system 436, and image capture and analysis system 444. Although certain exemplary embodiments may be directed to rail assets, the system 400 can be used to plan maintenance for a type of railroad asset, including rails, ballasts, panels, ties, turnouts, facilities, or any suitable asset. In another example, the railroad maintenance system 400 can be executed by any or all of the components of the machine 300 of FIG. 3.

In one exemplary embodiment, the file management system 402 can include a file retrieval module 404, data parsing module 406, and network communication module 408. The file retrieval module 404, data parsing module 406, and network communication module 408 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The file management system 402 can be configured to send and receive messages related to an inspection or other suitable activity, to and from the client or server. In another exemplary embodiment, the file management system 402 can generate one or more elements for display on the user device. The elements can provide additional information to the user related to an inspection. For example, alerts can be generated by the file management system 402 and displayed on the client to indicate inspection count, inspection completion, inspection submission, inspection request, or other suitable information. Additionally, system symbols can be displayed on the client to indicate inspection status.

The file retrieval module 404 can receive a maintenance operation request for a maintenance item. For example, the file retrieval module 404 can receive files including the maintenance operation via Universal Serial Bus (USB). In an example, the maintenance operation request can include a calibration location, a predetermined maintenance information, and location information for a maintenance operation. For example, the calibration location can identify to the first vehicle a location for the first vehicle to calibrate geolocation sensors. In another example, the predetermined maintenance information can include information about what type of maintenance will occur. For example, the predetermined maintenance information can correspond to performing maintenance on a particular railway tie. In an example, the location information for the maintenance operation can identify to the first vehicle a location of where the maintenance operation can occur. The file retrieval module 404 can locate files associated with a maintenance operation request based on an identifier for the files.

The data parsing module 406 can receive data for the maintenance operation and organize the data in response to known fields. For example, the data parsing module 406 can organize the data based on maintenance item type, maintenance operation request type, a type of vehicle, or another type of identifier to organize the data. In another example, the data parsing module 406 can append data to existing data sets to add a new maintenance operation while the first vehicle is in the field. In another example, the data parsing module 406 can remove data from the existing data to remove an old maintenance operation.

The network communication module 408 can establish a network connection between the first vehicle and one or more servers. For example, the network communication module 408 can execute either hardware or software to wirelessly, or in a wired manner, connect to the network 140. The network communication module 408 compares a strength of a network connectivity of the server with a known value to determine the network is accessible. In an example, the network communication module 408 can ping a known address of the vehicle to determine whether the vehicle is accessible. For example, the network communication module 408 can store the IP addresses of a plurality of vehicles to perform maintenance and transmit electrical signals through a network to the IP addresses. If the network is accessible based on a response from (e.g., based on responses from the particular IP addresses), the network communication module 408 can execute the identification module to further determine whether the vehicle is an identified vehicle for performing maintenance on the railway.

In one exemplary embodiment, the positioning system 410 can include a global position module 412, local position module 414, radar module 416, and a position verification module 418. global position module 412, local position module 414, radar module 416, and a position verification module 418 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The positioning system 410 can be configured to send and receive messages related to an inspection or other suitable activity, to and from the client or server. In another exemplary embodiment, the positioning system 410 can generate one or more elements for display on the user device. The elements can provide additional information to the user related to an inspection. For example, alerts can be generated by the positioning system 410 and displayed on the client to indicate inspection count, inspection completion, inspection submission, inspection request, or other suitable information. Additionally, system symbols can be displayed on the client to indicate inspection status.

The global position module 412 can verify the calibration location. For example, the global position module 412 can verify the calibration location based on a comparison between values of the location information with GPS data. The values of the location information can include latitude and longitude values associated with a location of the vehicle. In another example, the global position module 412 can verify the calibration location using real-time kinematic (RTK) corrected GPS data, radar signal processing, and/or a real-time image. In an example, the global position module 412 can compare the values of the location information with the GPS data including calculating a difference between the values with the GPS data. The difference can indicate whether the vehicle is located at the calibration location and whether the vehicle is calibrated.

The local position module 414 can identify the location of the first vehicle using localized means for location detection. For example, the first vehicle can identify the location of the first vehicle based on radar positioning. In an example, the first vehicle can transmit radio frequency energy and receive a response signal. From the response signal, the first locomotive can identify a location. Alternatively, the local position module 414 can identify the location using real-time imaging. For example, the first vehicle can identify the location based on matching a physical location from the real-time images.

The radar module 416 can transmit and receive electromagnetic energy. For example, the first locomotive can include a radar to transmit and receive the electromagnetic energy. The radar can receive a response from the electromagnetic energy reflecting off the local environment. From the response, the first vehicle can generate an image of the surrounding.

The radar module 416 can correspond with an energy threshold to avoid any received spurious signals. For example, the radar module 416 can receive electromagnetic energy from various sources, such as reflections of the transmitted signals off structures in the surrounding environment of the vehicle. For example, the energy threshold can be at a minimum when no electromagnetic energy reflects off any structures around the vehicle. Alternatively, the energy threshold can be at a maximum when all transmitted energy is reflected and returned to the radar module 416, for example, when an object is directly blocking hardware executed by the radar module 416.

The position verification module 418 can calculate a travel distance from the calibration location to a maintenance location based on the maintenance information. In another example, the position verification module 418 can verify a calibration location of a machine based on the maintenance information and the location information.

In one exemplary embodiment, the main control system 420 can include a hand controller module 422, stop module 424, electric interlock module 426, display module 428, movement module 430, engine control module 432, and machine identification module 434. The hand controller module 422, stop module 424, electric interlock module 426, display module 428, movement module 430, engine control module 432, and machine identification module 434 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The main control system 420 can be configured to send and receive messages related to an inspection or other suitable activity, to and from the client or server. In another exemplary embodiment, the main control system 420 can generate one or more elements for display on the user device. The elements can provide additional information to the user related to an inspection. For example, alerts can be generated by the main control system 420 and displayed on the client to indicate inspection count, inspection completion, inspection submission, inspection request, or other suitable information. Additionally, system symbols can be displayed on the client to indicate inspection status.

The hand controller module 422 can operate workheads of the first vehicle. For example, the hand controller module 422 can execute any of the modules in the workhead system 436. In an example, the hand controller module 422 can activate the spike puller module 438 to perform maintenance on the railway. For example, the hand controller module 422 can control the workhead modules manually or automatically. For example, the hand controller module 422 can be used by an operator to control one of the workhead modules to perform the maintenance on the railway. Alternatively, the hand controller module 422 can automatically control the workhead modules to operate.

The stop module 424 can cause the first vehicle to cease operation. For example, the stop module 424 can be an emergency switch to cut power from the first vehicle in an emergency. Alternatively, the stop module 424 can be manually executed or automatically executed. In an example, the stop module 424 can manually be executed by an operator in the first vehicle. Alternatively, the stop module 424 can automatically cease the power to the first vehicle when an emergency situation triggers the automatic response.

The electric interlock module 426 can connect power to various components of the first vehicle. For example, the components can include controllers, manifolds, sensors, and brakes of the first vehicle. In another example, the electric interlock module 426 can include protections from spurious power to the components and control the power to each of the components the electric interlock module 426 is connected.

The display module 428 can display information regarding the operations for maintenance. For example, the display can include a mobile phone, laptop, tablet, virtual reality system, augmented reality system, heads up display, or another type of display. In an example, the display module 428 can show icons that correspond to the various operations and maintenance the first vehicle can perform. For example, the display module 428 can illuminate the display as part of a windshield of the first vehicle in an augmented reality manner.

The movement module 430 can position a first vehicle having a GPS receiver identifying the first vehicle location at the calibration location by correlating the first vehicle location with the calibration location. In another example, the movement module 430 can travel the travel distance from the calibration location to the maintenance location to perform the maintenance operation for a maintenance item at the maintenance location. In another example, the movement module 430 can travel to the calibration location to calibrate the machine.

The movement module 430 can rely upon a movement threshold to follow safety protocols. For example, the movement threshold can allow slack in an accelerator to avoid unwanted movement of the vehicle. The movement threshold can be dependent on the type of machine. For example, when the machine is a member of the tie gang, the movement threshold can be at a minimum to allow for slight movements of the machine for alignment purposes to perform maintenance. Alternatively, when the machine is a freight locomotive, the movement threshold can be a maximum to incentivize purposeful movement to cause the freight locomotive to begin to travel.

The engine control module 432 can control movement of the first vehicle. For example, the engine control module 432 can cause the first vehicle to accelerate, decelerate, or stop completely. In another example, the engine control module 432 can be controlled manually or automatically. For example, an operator can control the engine control module 432 to move the first vehicle. Alternatively, the engine control module 432 can be controlled automatically based on various sensor inputs.

The machine identification module 434 can display engine control and diagnostic information. For example, the machine identification module 434 can show the mechanical characteristics of the engine for maintenance of the first vehicle. The machine identification module 434 can identify diagnostic information regarding the first vehicle.

In one exemplary embodiment, the workhead system 436 can include a spike puller module 438, anchor spreader module 440, and tie kicker module 442. The spike puller module 438, anchor spreader module 440, and tie kicker module 442 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The workhead system 436 can be configured to send and receive messages related to an inspection or other suitable activity, to and from the client or server. In another exemplary embodiment, the workhead system 436 can generate one or more elements for display on the user device. The elements can provide additional information to the user related to an inspection. For example, alerts can be generated by the workhead system 436 and displayed on the client to indicate inspection count, inspection completion, inspection submission, inspection request, or other suitable information. Additionally, system symbols can be displayed on the client to indicate inspection status.

The spike puller module 438 can perform a maintenance operation based on an analysis indicating a spike pulling operation is required. For example, the spike puller module 438 can control a spike puller. The spike puller is a railroad maintenance of way machine designed to remove rail spikes from ties. In another example, the spike puller module 438 can automatically perform the maintenance operation, without operator intervention. In another example, the maintenance item is to receive maintenance when the analysis meets a condition. For example, the condition can include a maintenance score of above or below a maintenance threshold. In an example, the maintenance item is to receive maintenance based on a maintenance indicator, where the maintenance indicator is based on whether the maintenance item already received maintenance. The maintenance item can indicate whether it already received maintenance based on a quality status of the maintenance item. For example, a maintenance item already receiving maintenance can correspond to a high-quality status indicating the maintenance item already received maintenance. When the maintenance item requires maintenance, the maintenance item can have a low-quality status. In another example, the maintenance item is to receive maintenance based on a comparison between the maintenance information and information from the image including railway plate hole characteristics, railway spike patterns, and a distance corresponding to the plate hole characteristics. For example, the maintenance information can include tie marking information and tie grading information. The tie marking information can correspond to indicating whether a particular railroad tie requires maintenance. In an example, the tie grading information can correspond to a grade of the maintenance item, where the grade is a spectrum indicating a relative quality of the maintenance item. In another example, the maintenance item includes a railway tie.

The anchor spreader module 440 can perform a maintenance operation based on an analysis indicating an anchor spreading operation is required. For example, the anchor spreader module 440 can control an anchor spreader. The anchor spreader is a type of maintenance equipment designed to spread or shape ballast profiles. In another example, the anchor spreader module 440 can automatically perform the maintenance operation, without operator intervention. In another example, the maintenance item is to receive maintenance when the analysis meets a condition. For example, the condition can include a maintenance score of above or below a maintenance threshold. In an example, the maintenance item is to receive maintenance based on a maintenance indicator, where the maintenance indicator is based on whether the maintenance item already received maintenance. The maintenance item can indicate whether it already received maintenance based on a quality status of the maintenance item. For example, a maintenance item already receiving maintenance can correspond to a high-quality status indicating the maintenance item already received maintenance. When the maintenance item requires maintenance, the maintenance item can have a low-quality status. In another example, the maintenance item is to receive maintenance based on a comparison between the maintenance information and information from the image including railway plate hole characteristics, railway spike patterns, and a distance corresponding to the plate hole characteristics. For example, the maintenance information can include tie marking information and tie grading information. The tie marking information can correspond to indicating whether a particular railroad tie requires maintenance. In an example, the tie grading information can correspond to a grade of the maintenance item, where the grade is a spectrum indicating a relative quality of the maintenance item. In another example, the maintenance item includes a railway tie.

The tie kicker module 442 can perform a maintenance operation based on an analysis indicating a tie kicking operation is required. For example, the tie kicker module 442 can control a tie kicker. The tie kicker is a mechanical system for removing and installing track and switch ties having a clamp for gripping the ties for removal and insertion. In another example, the tie kicker module 442 can automatically perform the maintenance operation, without operator intervention. In another example, the maintenance item is to receive maintenance when the analysis meets a condition. For example, the condition can include a maintenance score of above or below a maintenance threshold. In an example, the maintenance item is to receive maintenance based on a maintenance indicator, where the maintenance indicator is based on whether the maintenance item already received maintenance. The maintenance item can indicate whether it already received maintenance based on a quality status of the maintenance item. For example, a maintenance item already receiving maintenance can correspond to a high-quality status indicating the maintenance item already received maintenance. When the maintenance item requires maintenance, the maintenance item can have a low-quality status. In another example, the maintenance item is to receive maintenance based on a comparison between the maintenance information and information from the image including railway plate hole characteristics, railway spike patterns, and a distance corresponding to the plate hole characteristics. For example, the maintenance information can include tie marking information and tie grading information. The tie marking information can correspond to indicating whether a particular railroad tie requires maintenance. In an example, the tie grading information can correspond to a grade of the maintenance item, where the grade is a spectrum indicating a relative quality of the maintenance item. In another example, the maintenance item includes a railway tie.

In one exemplary embodiment, the image capture and analysis system 444 can include an image capture module 446, image analysis module 448, and visual position module 450. The image capture module 446, image analysis module 448, and visual position module 450 can implement one or more algorithms to connectivity to a network to communicate with a machine in a tie gang, ultimately to facilitate maintenance of a railroad asset and communicate data related to the maintenance performed. The algorithms and their associated thresholds and/or signatures can be programmable to suit a particular railroad asset, application, function, facility, or other requirement. The image capture and analysis system 444 can be configured to send and receive messages related to an inspection or other suitable activity, to and from the client or server. In another exemplary embodiment, the image capture and analysis system 444 can generate one or more elements for display on the user device. The elements can provide additional information to the user related to an inspection. For example, alerts can be generated by the image capture and analysis system 444 and displayed on the client to indicate inspection count, inspection completion, inspection submission, inspection request, or other suitable information. Additionally, system symbols can be displayed on the client to indicate inspection status.

The image capture module 446 can capture an image of the maintenance item. For example, the image capture module 446 can control a camera of the first vehicle. The image can include an environment of the first vehicle. Alternatively, the image can include the maintenance item.

The image analysis module 448 can generate an analysis of the maintenance item based on the image. For example, the analysis is based on image analysis techniques. In an example, wherein the image analysis techniques can include a machine learning model. In another example, the image analysis module 448 can transmit the image to a central server to generate the analysis. For example, the central server includes a server on a machine in a tie gang. In another example, the central server includes a server in a cloud-based environment.

The visual position module 450 can identify the location of the first vehicle based on the image of the environment. The visual position module 450 can correlate the image of the environment with the location information to match the image of the environment to the location of the first vehicle.

Figure 5A:
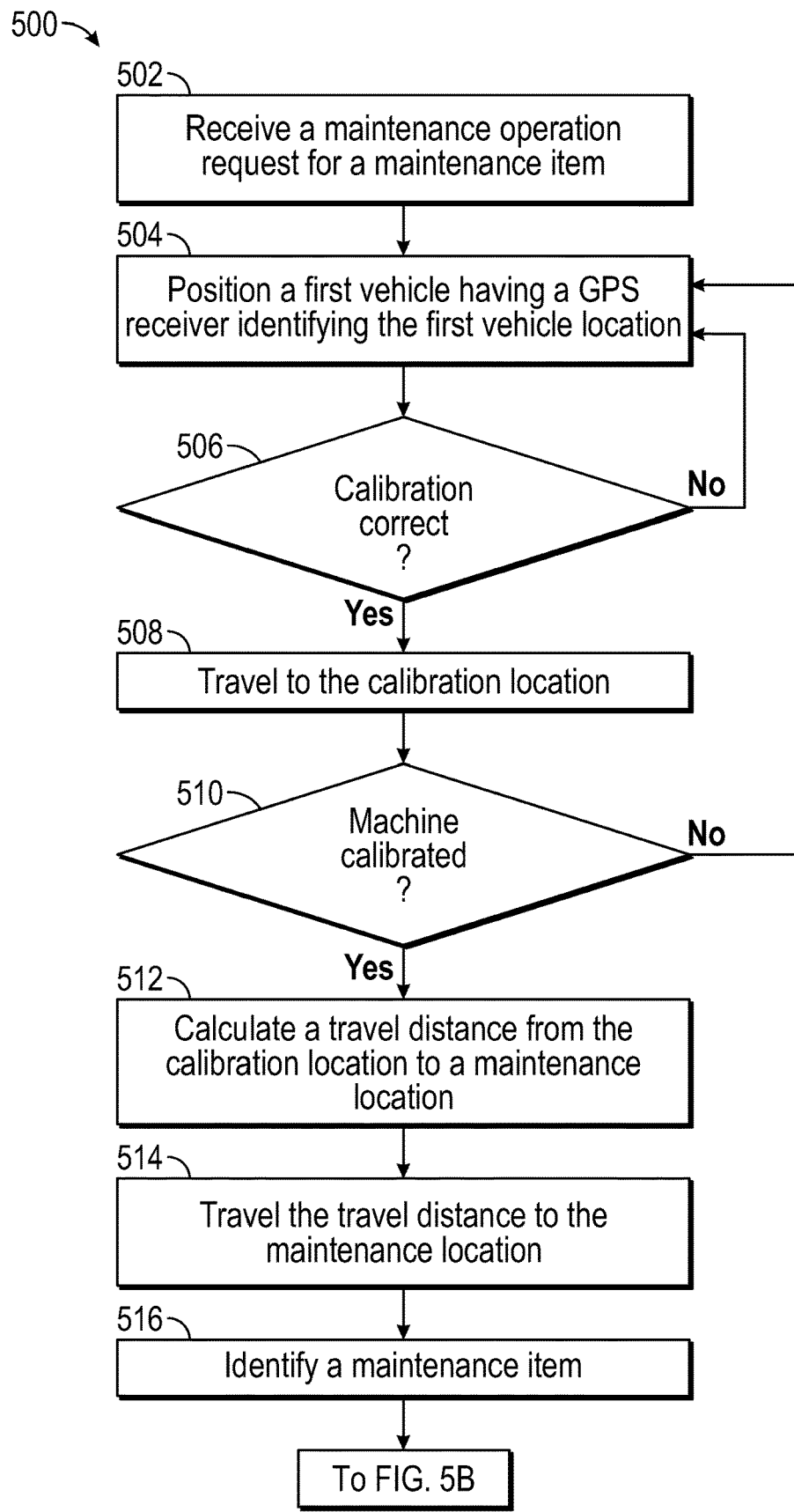
FIG. 5A illustrates a flowchart exemplifying railroad asset maintenance control logic, in accordance with one or more exemplary embodiments of the present disclosure.
Figure 5B:
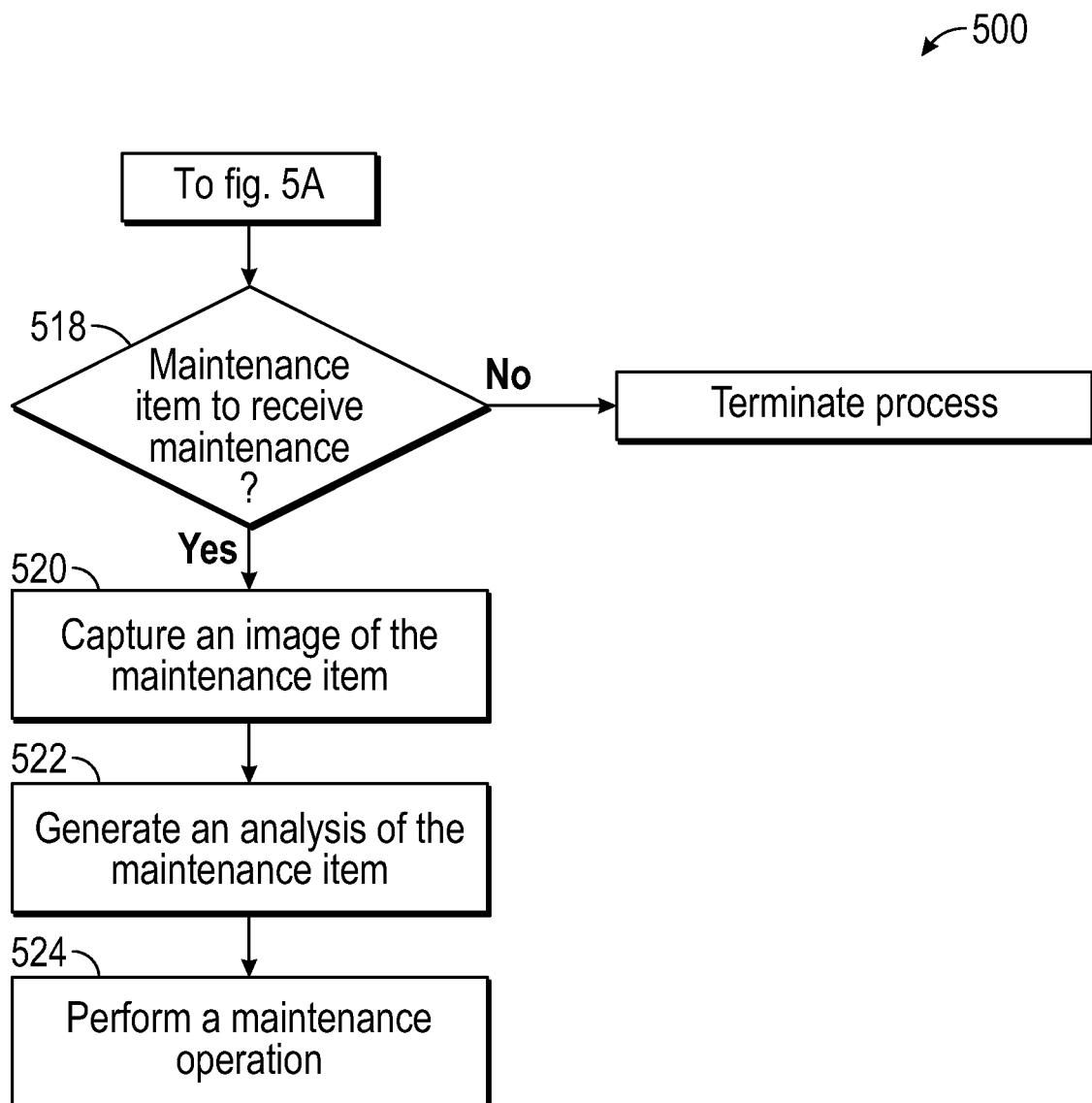
FIG. 5B illustrates a flowchart exemplifying railroad asset maintenance control logic, in accordance with one or more exemplary embodiments of the present disclosure.

FIGS. 5A-5B illustrates a flowchart exemplifying railroad asset maintenance control logic 500, in accordance with one or more exemplary embodiments of the present disclosure. The railroad asset maintenance control logic 500 can be implemented as an algorithm on a server 102, a machine learning module, a machine 150, a database, or other suitable system. Additionally, the railroad asset maintenance control logic 500 can implement or incorporate one or more features of the railroad maintenance system 400, including the file management system 402, positioning system 410, main control system 420, workhead system 436, and image capture and analysis system 444. The railroad asset maintenance control logic 500 can be achieved with software, hardware, firmware, an API, a network connection, a network transfer protocol, HTML, DHTML, JavaScript, Dojo, Ruby, Rails, other suitable applications, or a suitable combinations thereof.

The railroad asset maintenance control logic 500 can leverage the ability of a computer platform to spawn multiple processes and threads by processing data simultaneously. The speed and efficiency of the railroad asset maintenance control logic 500 can be greatly improved by instantiating more than one process to implement a curve-flow rail inspection. However, one skilled in the art of programming will appreciate that use of a single processing thread may also be utilized and is within the scope of the present disclosure.

In one exemplary embodiment, commands or data can be received via user input generated on a client or server, such as a screen tap, swipe, mouse click, key press, voice command, or other suitable mechanism. In another exemplary embodiment, the inspection commands or data can include inspection data having one or more fields, parameters, characteristics, or metadata, related to an inspection. The control logic 500 then proceeds to step 502.

At step 502, in an embodiment, the control logic 500 can receive a maintenance operation request for a maintenance item, the request having a calibration location, predetermined maintenance information, and location information for a maintenance operation. For example, the maintenance operation request for the maintenance item can include a unique production identifier to track scheduling of a maintenance workflow for a tie gang. The calibration location can include latitude and longitude values for locating the maintenance item. In an example, the calibration location can correspond to RTK-corrected GPS data for precise location determination. In another example, the calibration location can include image data visualizing an environment around the tie gang for image recognition of the location of the tie gang. In an example, the tie gang can use the latitude and longitude value for travel purposes, either manually or autonomously. The predetermined maintenance information can include a type of the maintenance item, a queue of production identifiers for the tie gang to perform maintenance, among other relevant maintenance information. The control logic 500 proceeds to step 504.

At step 504, in an embodiment, the control logic 500 can position a first vehicle having a GPS receiver identifying the first vehicle location at the calibration location by correlating the first vehicle location with the calibration location. For example, the first vehicle can correspond with any of the machines of the tie gang. The first vehicle can compare the first vehicle location with the calibration location to determine a distance to travel to reach the calibration location. The control logic 500 proceeds to step 506.

At step 506, in an embodiment, the control logic 500 can determine whether the first vehicle location is the same as the calibration location. For example, the control logic 500 can determine whether the first vehicle is located at the calibration location. The first vehicle can compare latitude and longitude values of the first vehicle location with latitude and longitude values of the calibration location. If the calibration locations are the same, the control logic 500 proceeds with step 508. If the maintenance locations are not the same, the control logic 500 proceeds with step 504.

At step 508, in an embodiment, the control logic 500 can execute motion control for the first vehicle to travel to the calibration location. For example, the control logic 500 can control relevant systems in the railroad maintenance system to cause the first vehicle to travel. In an example, the systems can include the positioning system 410 and the main control system 420, among other relevant modules. The control logic 500 then proceeds to step 510.

At step 510, in an embodiment, the control logic 500 can determine wither the first vehicle is calibrated. For example, the control logic 500 can calculate whether the first vehicle is located at the calibration location. The control logic 500 can compare latitude and longitude values of the first vehicle location after traveling to the calibration location and determine whether the two locations are the same. When the two locations are the same, the control logic 500 classifies the first vehicle as calibrated. If the first vehicle is calibrated, the control logic 500 proceeds to step 512. If the first vehicle is not calibrated, the control logic 500 then proceeds to step 504.

At step 512, in an embodiment, the control logic 500 can calculate a travel distance from the calibration location to a maintenance location based on the maintenance information. For example, the control logic 500 can determine a distance the first vehicle is to travel to reach the maintenance location. The first vehicle can compare latitude and longitude values of the calibration location with latitude and longitude values of the maintenance location. The control logic 500 can assign the difference between the calibration location and the maintenance location as the travel distance. The control logic 500 then proceeds to step 514.

At step 514, in an embodiment, the control logic 500 can travel the travel distance from the calibration location to the maintenance location to perform the maintenance operation for a maintenance item at the maintenance location. For example, the control logic 500 can control relevant systems in the railroad maintenance system to cause the first vehicle to travel. In an example, the systems can include the positioning system 410 and the main control system 420, among other relevant modules. The control logic 500 then proceeds to step 516.

At step 516, in an embodiment, the control logic 500 can identify a maintenance item. For example, the control logic 500 can identify the maintenance item by comparing a current first vehicle location with the maintenance location. When the current first vehicle location is the same as the maintenance location, the control logic 500 can confirm the first vehicle reached the maintenance item. The control logic 500 then proceeds to step 518.

At step 518, in an embodiment, the control logic 500 can determine whether the maintenance item is to receive maintenance. For example, when the first vehicle arrives at the maintenance location, the control logic 500 can determine whether the maintenance item is to receive maintenance based on matching the maintenance item with information from a production identifier. For example, the control logic 500 can match the production identifier to the maintenance item identifying what type of maintenance is to be performed by the first vehicle. In another example, the maintenance can include various workhead activities, such as spike pulling, anchor spreading, tie kicking, or any other maintenance activity of the tie gang. The control logic 500 then proceeds to step 520.

At step 520, in an embodiment, capture an image of the maintenance item. For example, when the first vehicle reaches the maintenance location, the control logic 500 can capture an image of the maintenance item using an image capture module (e.g., the image capture and analysis system 444 of FIG. 4). The control logic 500 then proceeds to step 522.

At step 522, in an embodiment, the control logic 500 can generate the analysis of the maintenance item based on the image. The control logic 500 can analyze the image of the maintenance item using an image analysis framework. For example, the image analysis framework can include a machine learning model, trained on data of railroad assets, to classify whether the railroad asset is the maintenance item. The image analysis framework can include an image comparison ability to compare a known railroad asset to the image to determine whether the image includes the maintenance item. In another example, the control logic 500 can transmit the image to a central server to generate an analysis. The control logic 500 then proceeds to step 524.

At step 524, in an embodiment, the control logic 500 can perform a maintenance operation based on the analysis. For example, the maintenance operation can include various workhead activities, such as spike pulling, anchor spreading, tie kicking, or any other maintenance activity of the tie gang. In an example, the control logic 500 can perform the maintenance operation automatically. The control logic 500 then terminates or awaits a new inspection creation request and can repeat the aforementioned steps.

Figure 6:
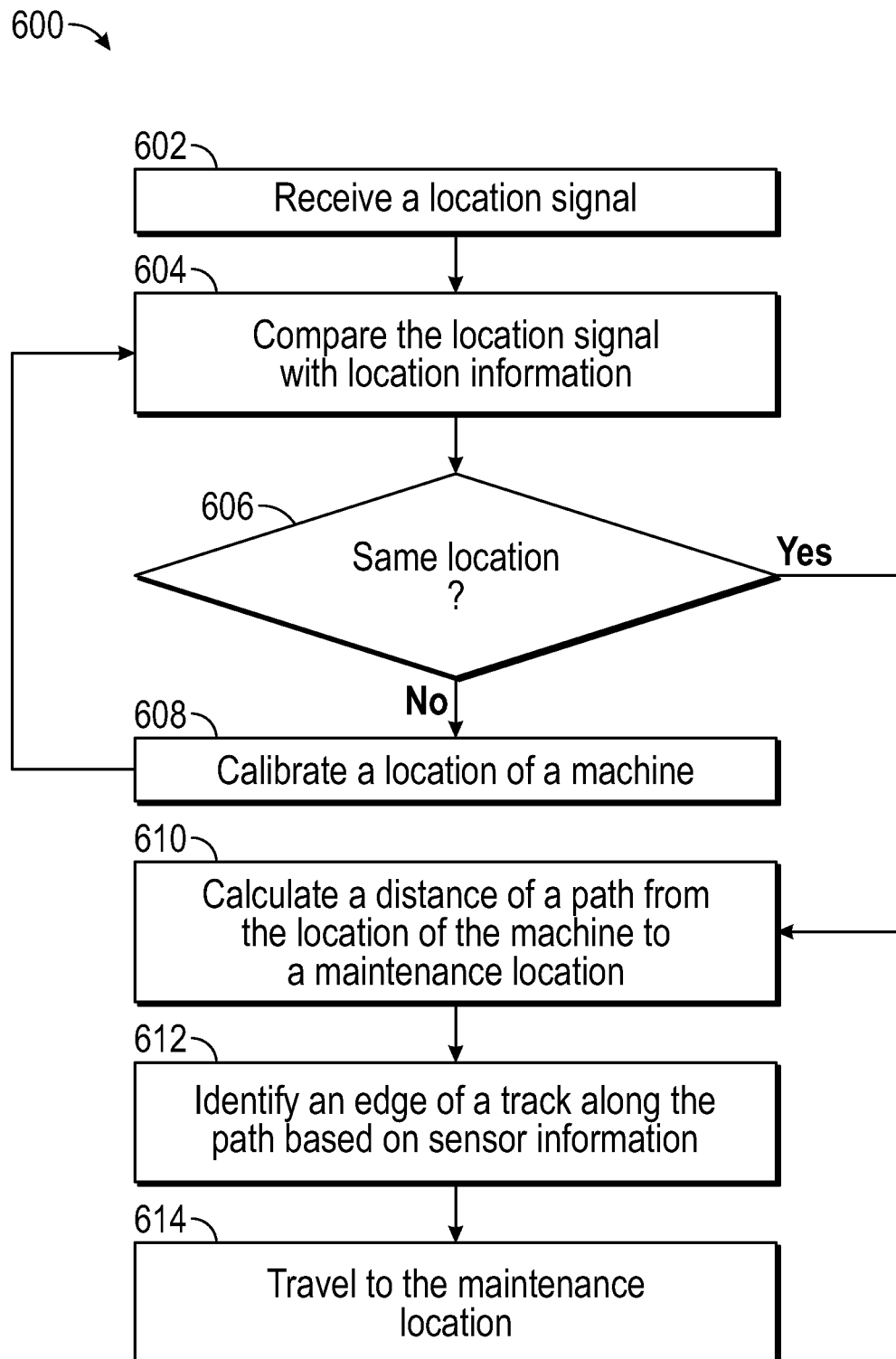
FIG. 6 illustrates a flowchart exemplifying tie gang guidance control logic, in accordance with one or more exemplary embodiments of the present disclosure.

FIG. 6 illustrates a flowchart exemplifying rail inspection control logic 600, in accordance with one or more exemplary embodiments of the present disclosure. The rail inspection control logic 600 can be implemented as an algorithm on a server 102, a machine learning module, a machine 150, a database, or other suitable system. Additionally, the rail inspection control logic 600 can implement or incorporate one or more features of the railroad maintenance system 400, including the file management system 402, positioning system 410, main control system 420, workhead system 436, and image capture and analysis system 444. The rail inspection control logic 600 can be achieved with software, hardware, firmware, an API, a network connection, a network transfer protocol, HTML, DHTML, JavaScript, Dojo, Ruby, Rails, other suitable applications, or a suitable combinations thereof.

The rail inspection control logic 600 can leverage the ability of a computer platform to spawn multiple processes and threads by processing data simultaneously. The speed and efficiency of the rail inspection control logic 600 can be greatly improved by instantiating more than one process to implement a tangent-flow rail inspection. However, one skilled in the art of programming will appreciate that use of a single processing thread may also be utilized and is within the scope of the present disclosure.

The rail inspection control logic 600 of the present embodiment begins at step 602, where, in an embodiment, the control logic 600 can receive a location signal. For example, the location signal can correspond to received electromagnetic energy (e.g., from satellite communications, radar signal processing, real-time image processing, etc.). The control logic 600 can include latitude and longitude values for locating the maintenance item. In an example, the location signal can correspond to RTK-corrected GPS data for precise location determination. In another example, the location data can include image data visualizing an environment around the tie gang for image recognition of the location of the tie gang. In an example, the tie gang can use the latitude and longitude value for travel purposes, either manually or autonomously. The predetermined maintenance information can include a type of the maintenance item, a queue of production identifiers for the tie gang to perform maintenance, among other relevant maintenance information. The control logic 600 then proceeds to step 604.

At step 604, in an embodiment, the control logic 600 can compare the location signal with location information from a file to calibrate a location of a machine. For example, the control logic 600 can calculate the value difference between the location signal with the location information to determine an offset for calibration purposes. In an example, the control logic 600 can compensate the location information based on the location signal. For example, the control logic 600 can update the location information based on the location signal. The control logic 600 then proceeds to step 606.

At step 606, in an embodiment, the control logic 600 can determine whether the location signal and the location information are the same. For example, the control logic 600 can calculate the value difference between the location signal with the location information to determine whether the locations are the same. If the locations are the same, the control logic 600 then proceeds to step 610. If the locations are different, the control logic 600 then proceeds to step 608.

At step 608, in an embodiment, the control logic 600 can calibrate a location of the machine. In an example, the control logic 600 can compensate the location information based on the location signal. For example, the control logic 600 can update the location information based on the location signal. In an example, the control logic 600 can either substitute the location information for values from the location signal or can calculate an offset between the location information and the values from the location signal and calibrate the location information accordingly. The control logic 600 then proceeds to step 604.

At step 610, in an embodiment, the control logic 600 can calculate a distance of a path from the location of the machine to a maintenance location. When the control logic 600 calibrates the location information, the control logic 600 can compare the location information with the maintenance location to determine the distance for the machine to travel. In an example, the control logic 600 can include preset railway information of the railway between the location information and the maintenance location. For example, the preset railway information can include curves lengthening the distance as compared to a direct route between the location information and the maintenance location. The control logic 600 proceeds to step 612.

At step 612, in an embodiment, the control logic 600 can identifying an edge of a track along the path based on sensor information. For example, the control logic 600 can capture an image of the railway as the sensor information and identify edges of tracks of the railway. In another example, the control logic 600 can transmit and receive electromagnetic energy to determine the edges of the track (e.g., using a forward-looking radar, short wave radar, among other electromagnetic components). In an example, the sensor information corresponds to physical characteristics resulting from the electromagnetic energy. When identifying the edges of the track, the control logic 600 can identify any obstacles ahead of the machine on the railway. The control logic 600 then proceeds to step 614.

At step 614, in an embodiment, the control logic can travel to the maintenance location. For example, the control logic 600 can control relevant systems in the railroad maintenance system to cause the first vehicle to travel. In an example, the systems can include the positioning system 410 and the main control system 420, among other relevant modules. The control logic 600 then terminates or awaits a new inspection creation request and can repeat the aforementioned steps.

Figure 7:
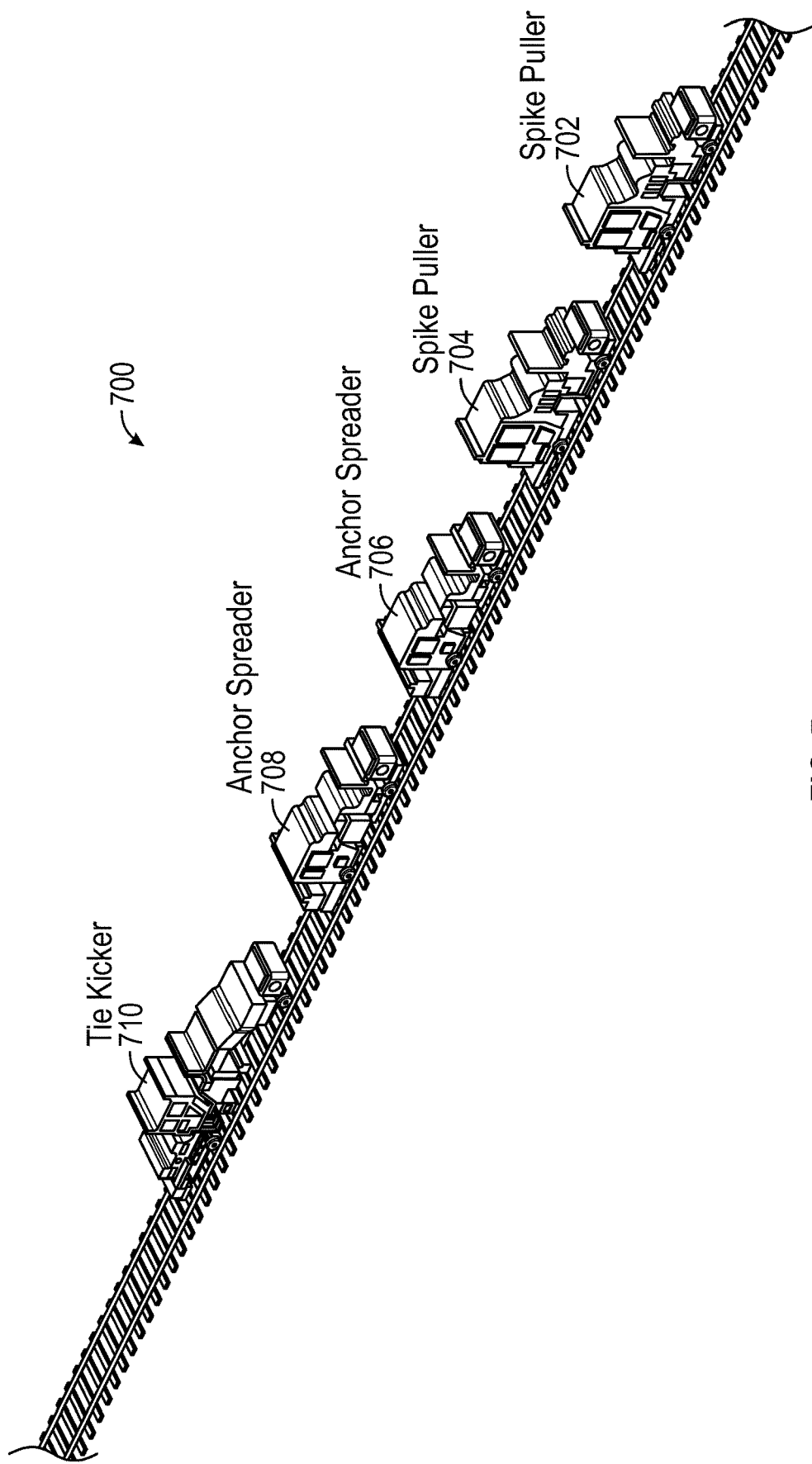
FIG. 7 illustrates a perspective view of a plurality of machines disposed on railroad tracks, in accordance with one or more exemplary embodiments of the present disclosure.

FIG. 7 illustrates a perspective view of a plurality of machines disposed on railroad tracks, generally referenced as 700, in accordance with one or more exemplary embodiments of the present disclosure. For example, a machine can be a spike puller 702, anchor spreader 706, tie kicker 710, locomotive, or any machine related to railway maintenance or operations. In another embodiment, a tie gang can include one or more of each type of machine, or none of some types of machines, based upon the type of maintenance to be performed. For example, the tie gang can include a first spike puller 702, a second spike puller 704, a first anchor spreader 706, a second anchor spreader 708, a tie kicker 710, a locomotive, or any machine related to railway maintenance or operations. In another embodiment, the machines can be spaced a predetermined distance for safety. For example, the machines can maintain a minimum fifty-foot safety distance. In another embodiment, the safety distance can vary based up-on the machine type. In another embodiment, the lead vehicle (e.g., spike puller 702) can include a digital line scan and gauge camera. The embodiments disclosed herein can be operable in a tie gang similar to that shown in FIG. 7, as well as with more machines, fewer machines, and/or different machines.

The present disclosure achieves at least the following advantages:
1. improves organization and accessibility of asset inspections and maintenance, among other technological improvements;
2. increases the efficiency of asset inspections and inspectors via improved systems that can add and modify prompts based on responses;
3. eliminates the need to paint ties;
4. reduces the hazard exposure of personnel walking track;
5. provides costs savings for paint and personnel;
6. provides a unified platform for facilitating railroad asset inspections; and
7. provides centralized and accessible data models and criteria for assets throughout the railroad infrastructure, enabling faster and more-informed decision making.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Particularly, the term machine is not intended to invoke 35 U.S.C. § 112(f), as disclosed herein. Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A method for guiding a tie gang to perform maintenance, comprising:
   receiving at least one location signal including location data having latitude and longitude values for a machine, a maintenance item, or both;
   comparing, via a processor, the latitude and longitude values with stored location information to calibrate a location of the machine, wherein the stored location information is stored in a file associated with a maintenance operation request including the at least one location signal, wherein calibrating the location of the machine includes updating the stored location information in the file associated with the maintenance operation request based on the latitude and longitude values of the at least one location signal when the stored location information and the latitude and longitude values of the at least one location signal are different;
   calculating a distance of a path from the location of the machine to a maintenance item location; and
   traveling to the maintenance item location.

2. The method of claim 1, further comprising identifying an edge of a track along the path based on sensor information.

3. The method of claim 2, wherein the sensor information includes at least one of a real-time image or radar signal processing data.

4. The method of claim 1, wherein the location signal includes at least one of radar signal processing data, global positioning system (GPS) data, or real-time kinematic (RTK)-corrected GPS data.

5. The method of claim 1, wherein the location data includes image data visualizing an environment around a tie gang including the machine for image recognition of the location of the tie gang.

6. The method of claim 1, wherein a tie gang uses the latitude and longitude values for autonomous travel.

7. The method of claim 1, wherein the processor compensates the location information based on the location signal.

8. The method of claim 1, wherein the comparing the latitude and longitude values with stored location information includes calculating the value difference between the location signal with the location information to determine whether the locations are the same.

9. The method of claim 1, wherein updating the stored location information based on the latitude and longitude values of the at least one location signal includes substituting the latitude and longitude values from the location signal.

10. The method of claim 1, wherein updating the stored location information based on the latitude and longitude values of the at least one location signal includes calculating an offset between the machine location and the latitude and longitude values from the location signal.

11. The method of claim 1, wherein calculating the distance of the path from the location of the machine to the maintenance item location comprises utilizing preset railway information that includes a plurality of curves of a track.

12. A system for guiding a tie gang to perform maintenance, comprising:
   a memory including location data; and
   a processor operably coupled to the memory and capable of executing machine-readable instructions to perform program steps, the program steps comprising:
      receiving at least one location signal including location data having latitude and longitude values for a machine, a maintenance item, or both;
      comparing, via a processor, the latitude and longitude values with stored location information to calibrate a location of the machine, wherein the stored location information is stored in a file associated with a maintenance operation request including the at least one location signal, wherein calibrating the location of the machine includes updating the stored location information in the file associated with the maintenance operation request based on the latitude and longitude values of the at least one location signal when the stored location information and the latitude and longitude values of the at least one location signal are different;
      calculating a distance of a path from the location of the machine to a maintenance item location; and
      traveling to the maintenance item location.

13. The system of claim 12, the program steps further comprising identifying an edge of a track along the path based on sensor information.

14. The system of claim 13, wherein the sensor information includes at least one of a real-time image or radar signal processing data.

15. The system of claim 12, wherein:
   the location signal includes at least one of radar signal processing data, global positioning system (GPS) data, or real-time kinematic (RTK)-corrected GPS data; and
   the location data includes image data visualizing an environment around a tie gang including the machine for image recognition of the location of the tie gang.

16. The system of claim 12, wherein a tie gang uses the latitude and longitude values for autonomous travel.

17. The system of claim 12, wherein the processor compensates the location information based on the location signal.

18. The system of claim 12, wherein the comparing the latitude and longitude values with stored location information includes calculating the value difference between the location signal with the location information to determine whether the locations are the same.

19. The system of claim 12, wherein updating the stored location information based on the latitude and longitude values of the at least one location signal includes substituting the latitude and longitude values from the location signal.

20. The system of claim 12, wherein updating the stored location information based on the latitude and longitude values of the at least one location signal includes calculating an offset between the machine location and the latitude and longitude values from the location signal.

* * * * *